US011349179B2

United States Patent
Yanagida et al.

(10) Patent No.: US 11,349,179 B2
(45) Date of Patent: May 31, 2022

(54) WIRING MODULE AND POWER STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Taiji Yanagida, Mie (JP); Hiroki Shimoda, Mie (JP); Yoshinori Ito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 147 days.

(21) Appl. No.: 16/419,487

(22) Filed: May 22, 2019

(65) Prior Publication Data
US 2019/0372077 A1 Dec. 5, 2019

(30) Foreign Application Priority Data
May 30, 2018 (JP) .............................. JP2018-103599

(51) Int. Cl.
*H01M 50/502* (2021.01)
*H01M 10/48* (2006.01)
(Continued)

(52) U.S. Cl.
CPC .......... *H01M 50/502* (2021.01); *B60R 16/02* (2013.01); *H01M 10/4207* (2013.01);
(Continued)

(58) Field of Classification Search
CPC ...... H01M 2/206; H01M 2/1077; H01M 2/26; H01M 10/4207; H01M 10/482; H01R 11/288
See application file for complete search history.

(56) References Cited

U.S. PATENT DOCUMENTS 9,461,293 B2 * 10/2016 Ochi ..................... H01M 2/206
2011/0064986 A1   3/2011 Ogasawara et al.
(Continued)

FOREIGN PATENT DOCUMENTS

JP         2011-067012         3/2011

*Primary Examiner* — Ula C Ruddock
*Assistant Examiner* — Thomas H. Parsons
(74) *Attorney, Agent, or Firm* — Greenblum & Bernstein, P.L.C.

(57) ABSTRACT

A plurality of sets of power storage devices each formed by connecting a plurality of power storage devices in parallel are connected in series. A wiring module that is arranged on a plurality of power storage devices each having electrode terminals, the wiring module including: a plurality of connection bus bars each connected to a corresponding electrode terminal and each having 2n (n is a natural number greater than or equal to 2) electrode connection portions; and an insulating protector that houses the plurality of connection bus bars. In each of the plurality of connection bus bars, the cross-sectional areas of the second electrode connection portion from the right of the connection bus bar and the third electrode connection portion from the right of the connection bus bar are set to be larger than the cross-sectional areas of the other electrode connection portions.

10 Claims, 8 Drawing Sheets

(51) Int. Cl.
*H01R 11/28* (2006.01)
*B60R 16/02* (2006.01)
*H01M 10/42* (2006.01)
*H01M 50/20* (2021.01)
*H01M 50/531* (2021.01)

(52) U.S. Cl.
CPC ......... *H01M 10/482* (2013.01); *H01M 50/20* (2021.01); *H01M 50/531* (2021.01); *H01R 11/288* (2013.01); *H01M 2220/20* (2013.01)

(56) References Cited

U.S. PATENT DOCUMENTS

| | | | | |
|---|---|---|---|---|
| 2015/0171405 A1* | 6/2015 | Lee | ...................... | H01M 2/206 429/89 |
| 2016/0294023 A1* | 10/2016 | Aoki | ...................... | H01M 2/30 |
| 2019/0020011 A1* | 1/2019 | Yamanaka | .......... | H01M 50/572 |

* cited by examiner

[FIG. 4]

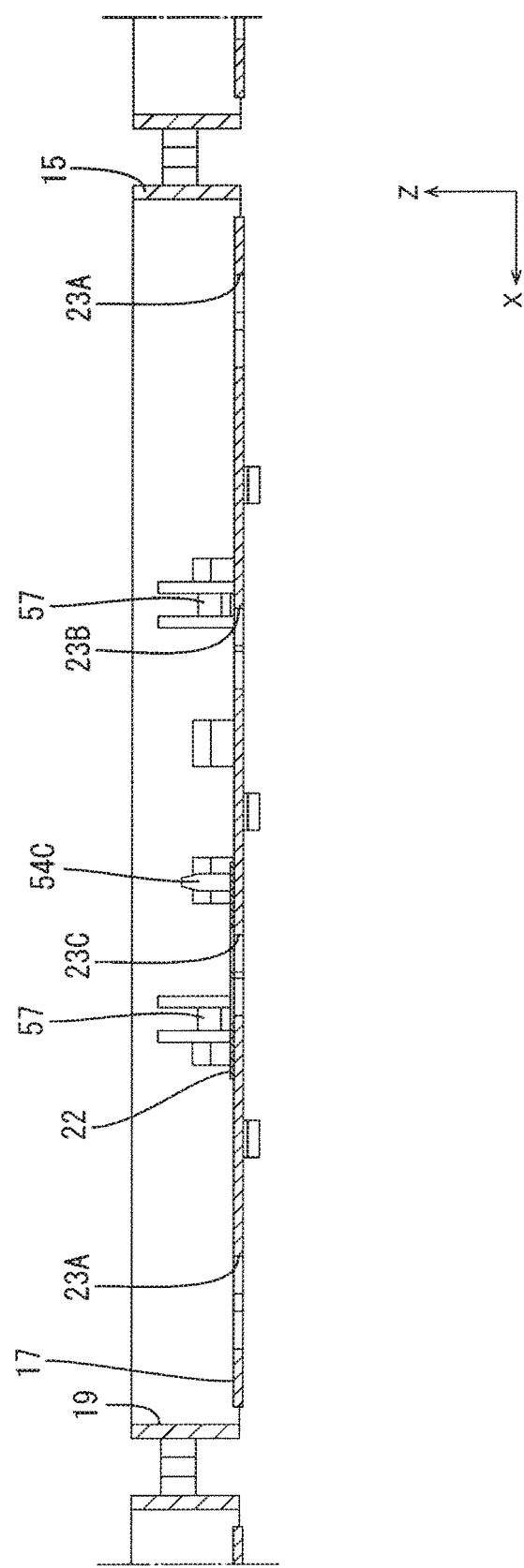

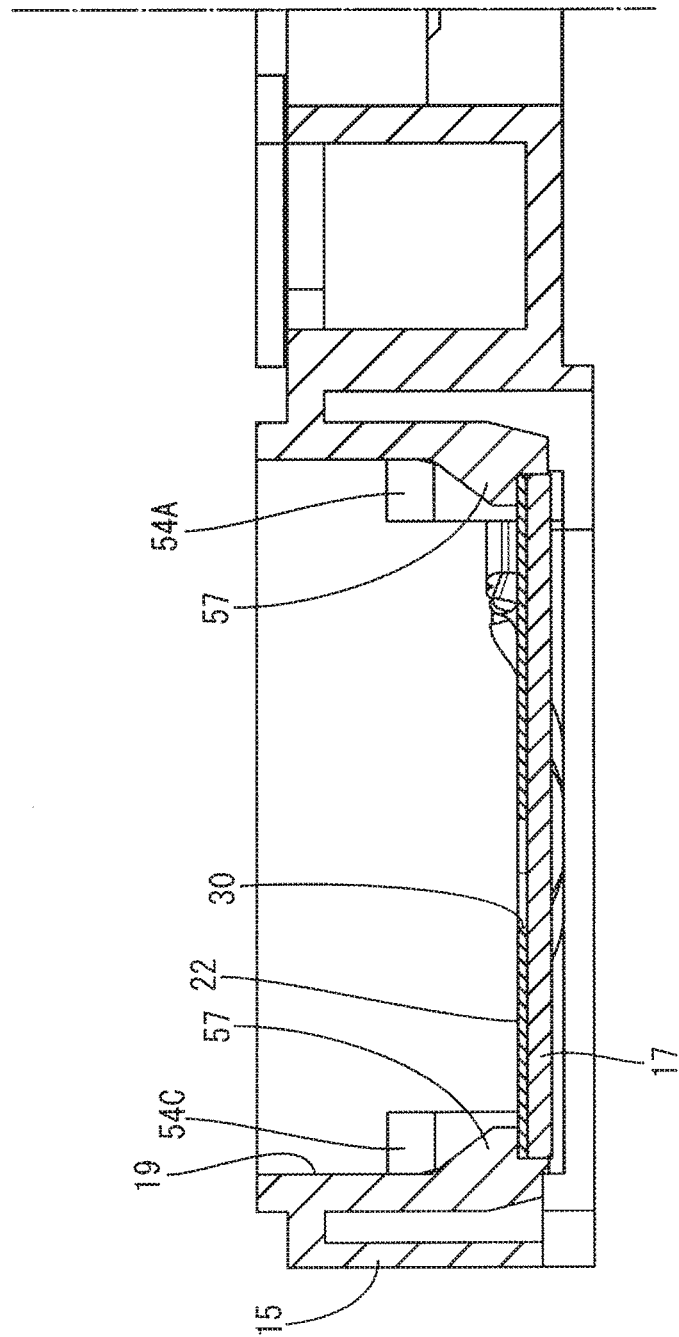

WIRING MODULE AND POWER STORAGE MODULE

TECHNICAL FIELD

The technology disclosed in the present specification relates to a wiring module and a power storage module.

BACKGROUND ART

The technology disclosed in JP 2011-67012A is known as a wiring module that is attached to a plurality of power storage devices. This wiring module has a plurality of bus bars each for connecting adjacent power storage devices in series and an insulating protector for housing the plurality of bus bars.

Each bus bar has two through-holes through which electrode terminals of a power storage device are passed. An electrode terminal of one power storage device and an electrode terminal of another power storage device adjacent to the one power storage element, which is different in polarity from the electrode terminal of the one power storage device, are passed through the two respective through-holes. Thus, the adjacent power storage devices are connected in series with each other. For example, a positive electrode terminal of one power storage device is passed through one through-hole of the bus bar, and a negative electrode terminal of another power storage device adjacent to the one power storage device is passed through the other through-hole.

JP 2011-67012A is an example of related art.

SUMMARY OF THE INVENTION

In recent years, power storage devices used as motive power sources for electric automobiles and hybrid automobiles are required to have improved capacity in order to improve the cruising distance. In order to improve the entire capacity of a power storage module that has a plurality of power storage devices, it is conceivable to serially connect power storage units each formed by connecting a plurality of power storage devices in parallel. In this way, it is expected that the entire capacity of the power storage module can be improved.

However, a bus bar used for the above-described wiring module has merely been considered a configuration in which two adjacent power storage devices are connected in series. For this reason, a technology for serially connecting a plurality of power storage device units each formed by connecting a plurality of power storage devices in parallel has been required.

The technology disclosed in the present specification was achieved in light of the above-described circumstances, and it is an object of the present invention to provide a technology related to a wiring module for serially connecting a plurality of sets of power storage devices each formed by connecting a plurality of power storage devices in parallel.

One aspect of the technology disclosed in the present specification is a wiring module that is to be arranged on a plurality of power storage devices each having electrode terminals, the wiring module including: a plurality of bus bars each connected to a corresponding electrode terminal, and each having 2n electrode connection portions and 2n−1 linking portions each linking adjacent electrode connection portions among the 2n electrode connection portions, where n is a natural number greater than or equal to 2; and an insulating protector that houses the plurality of bus bars. In each of the plurality of bus bars, a cross-sectional area of the n-th linking portion from one end portion of the bus bar is set to be the largest among the cross-sectional areas of all of the 2n−1 linking portions.

With the above-described configuration, because the bus bar has 2n (n is a natural number greater than or equal to 2) electrode connection portions, the sets of power storage devices each formed by connecting n power storage devices in parallel can be connected in series using one bus bar. At this time, the current density of the n-th linking portion that links the n-th electrode connection portion and the (n+1)-th electrode connection portion is larger than that of the other linking portions. For this reason, there is a concern that the amount of heat generated may increase during energization. According to the technology disclosed in the present specification, the cross-sectional area of the n-th linking portion is set to be larger than the cross-sectional areas of the other linking portions. Accordingly, the electrical resistance of the n-th linking portion can be made smaller than those of the other linking portions. In this manner, the amount of heat generated in the n-th linking portion can be reduced during energization.

The following embodiments are preferable as embodiments of the technology described in the present specification.

In each of the bus bars, the cross-sectional area of the first linking portion from the one end portion of the bus bar is the smallest of the cross-sectional areas of the first to the n-th linking portions, and the cross-sectional area of the (2n−1)-th linking portion from the one end portion of the bus bar is the smallest of the cross-sectional areas of the n-th to the (2n−1)-th linking portions.

The current density of the first linking portion is smaller than that of the n-th linking portion, and thus the amount of heat generated in the first linking portion during energization is smaller than that of the n-th linking portion. Similarly, the amount of heat generated in the (2n−1)-th linking portion is smaller than that of the n-th linking portion. With the above-described configuration, the cross-sectional areas of the first and the (2n−1)-th linking portions can be made small, and thus the weight of the bus bar can be reduced.

In each of the bus bars, the cross-sectional area sequentially increases from the first linking portion to the n-th linking portion from the one end portion of the bus bar, and the cross-sectional area sequentially decreases from the n-th linking portion to the (2n−1)-th linking portion from the one end portion of the bus bar.

With the above-described configuration, the cross-sectional area of the linking portion can be set according to the magnitude of the current density, and thus the amount of heat generated during energization can be reliably reduced.

In each of the bus bars, the cross-sectional areas of the two linking portions located symmetrically with respect to the n-th linking portion are set equal to each other.

With the above-described configuration, because the cross-sectional areas of the linking portions that have the same level of current density can be set equal to each other, the cross-sectional area of the linking portion is prevented from being larger than necessary. As a result, the weight of the bus bar can be reduced.

In each of the of bus bars, the cross-sectional areas of the n-th electrode connection portion and the (n+1)-th electrode connection portion are set larger than the cross-sectional areas of other electrode connection portions.

With the above-described configuration, because the bus bar has 2n (n is a natural number greater than or equal to 2) electrode connection portions, the sets of power storage devices each formed by connecting n power storage devices in parallel can be connected in series using one bus bar. At this time, the current density of the n-th electrode connection portion and the (n+1)-th electrode connection portion is larger than that of the other electrode connection portions. For this reason, there is a concern that the amount of heat generated may increase during energization. With the technology disclosed in the present specification, the cross-sectional areas of the n-th and the (n+1)-th electrode connection portions are set to be larger than those of other electrode connection portions. Accordingly, the amount of heat generated in the n-th and the (n+1)-th electrode connection portions can be reduced during energization.

In each of the bus bars, the n-th and the (n+1)-th electrode connection portions from the one end portion of the bus bar are formed to be wider than the other electrode connection portions.

With the above-described technology, the cross-sectional areas of the n-th and the (n+1)-th electrode connection portions can be made larger than those of the other electrode connection portions using a simple method of making the width dimensions of the n-th and the (n+1)-th electrode connection portions larger than those of the other electrode connection portions. Accordingly, the manufacturing cost of the wiring module can be kept from increasing.

In each of the bus bars, on one or both of the n-th electrode connection portion and the (n+1)-th electrode connection portion from the one end portion of the bus bar, a positioning receiving portion for positioning relative to the insulating protector by engaging with a positioning portion provided on the insulating protector is provided.

With the above-described configuration, because the positioning receiving portion is provided in one or both of the n-th and the (n+1)-th electrode connection portions that are formed to be wider than the other electrode connection portions of the bus bars, a reduction in the cross-sectional area of the bus bar caused by providing the positioning receiving portion can be suppressed.

At least one through-hole is formed in each of the plurality of electrode connection portions, and, in each of the bus bars, the opening areas of the through-hole of the n-th electrode connection portion from the one end portion of the bus bar and the through-hole of the (n+1)-th electrode portion from the one end portion of the bus bar are set smaller than the opening areas of the through-holes of the other electrode connection portions.

With the above configuration, a reduction in the cross-sectional areas of the n-th electrode connection portion and the (n+1)-th electrode connection portion with the highest current density can be suppressed.

In each of the bus bars, a voltage detection terminal that is electrically connected to a corresponding electrode terminal is connected to at least one of the n-th electrode connection portion and the (n+1)-th electrode connection portion from the one end portion of the bus bar.

With the above-described configuration, the contact area between the voltage detection terminal and at least one of the n-th electrode connection portion and the (n+1)-th electrode connection portion can be made larger than that of the case in which one of the other electrode connection portions and the voltage detection terminal are connected to each other. As a result, accuracy in detecting the voltage of the power storage device can be improved.

A power storage module according to the technology disclosed in the present specification includes a plurality of power storage devices each having electrode terminals, and a wiring module.

With the above-described configuration, the sets of power storage devices each formed by connecting n power storage devices in parallel can be connected in series. In this manner, the entire capacity of the power storage module can be improved.

With the technology disclosed in the present specification, a plurality of sets of power storage devices each formed by connecting a plurality of power storage devices in parallel can be connected in series.

BRIEF DESCRIPTION OF THE DRAWINGS

FIG. 7 is a cross-sectional view taken along line VII-VII in FIG. 6.

FIG. 8 is a cross-sectional view taken along line VIII-VIII in FIG. 6

EMBODIMENTS OF THE INVENTION

Embodiment 1

Embodiment 1 of the technology disclosed in the present specification will be described with reference to FIGS. 1 to 8. A wiring module 10 according to the present embodiment constitutes a power storage module 13 by being attached to a power storage device group 12, which is a plurality of power storage devices (twelve in the present embodiment) 11 that are arranged side-by-side. The power storage module 13 is installed in a vehicle (not shown) such as an electric automobile or a hybrid automobile, and is used as a motive power source for driving the vehicle. In the description below, a description is given in which the Z direction is the upward direction, the Y direction is the forward direction, and the X direction is the leftward direction. Also, there may be cases where, for a plurality of the same members, a reference number is assigned to some of them and not assigned to the other members.

Power Storage Device 11

Figure 1:
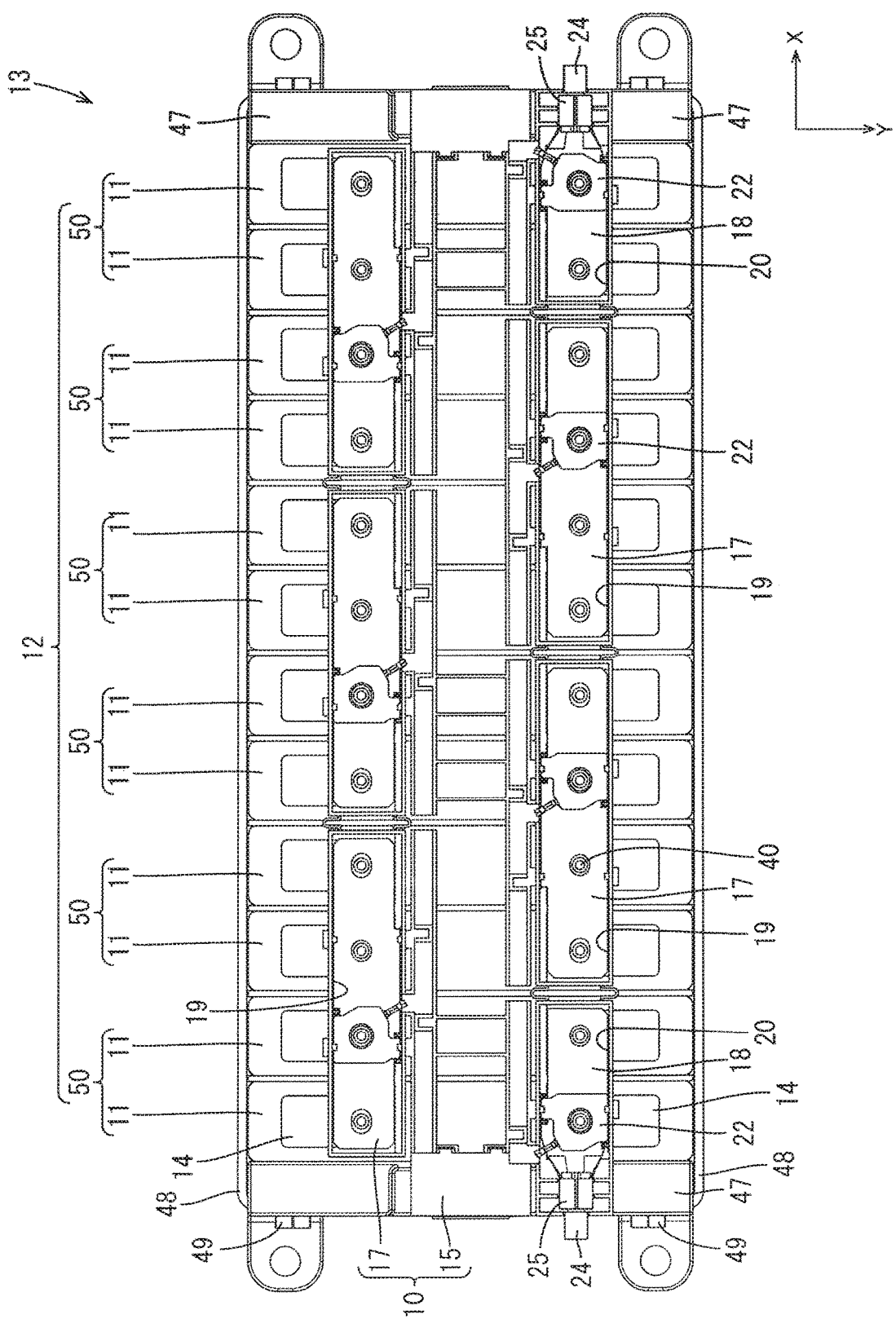
FIG. 1 is a plan view of a power storage module according to Embodiment 1.

As shown in FIG. 1, each of the power storage devices 11 according to the present embodiment is a secondary battery. Power storage elements (not shown) are housed in the power storage devices 11. The power storage devices 11 have a substantially rectangular parallelepiped shape. A pair of electrode terminals 14 are provided on the upper surface of each power storage device 11 at positions close to the two end portions in the front-rear direction, respectively. One electrode terminal 14 is a positive terminal and the other is a negative terminal.

The power storage device group 12 is formed by arranging a plurality of sets 50 of power storage devices 11, in which two power storage devices 11 are arranged so that electrode terminals 14 with the same polarity are adjacent to each other, in the left-right direction (an example of an alignment direction). The sets 50 of power storage devices 11 are aligned such that the polarities of electrode terminals 14 are different in adjacent sets 50 of power storage devices 11. For example, in one set of power storage devices 11, if the positive electrodes are arranged on the front side and the negative electrodes are arranged on the rear side, in another set 50 of power storage devices 11 adjacent to the said set 50 of power storage devices 11, the negative electrodes are arranged on the front side and the positive electrodes are arranged on the rear side.

A pair of end plates 47 are arranged on the left and right end portions of the power storage device group 12. The pair of end plates 47 are held between a pair of sandwiching plates 48 that are disposed on the front and rear side surfaces of the power storage device group 12 and fixed to the end plates 47 using bolts 49.

Wiring Module 10

As shown in FIG. 1, the wiring module 10 is attached to the upper surface of the power storage device group 12. Overall, the wiring module 10 is elongated in the left-right direction.

Figure 2:
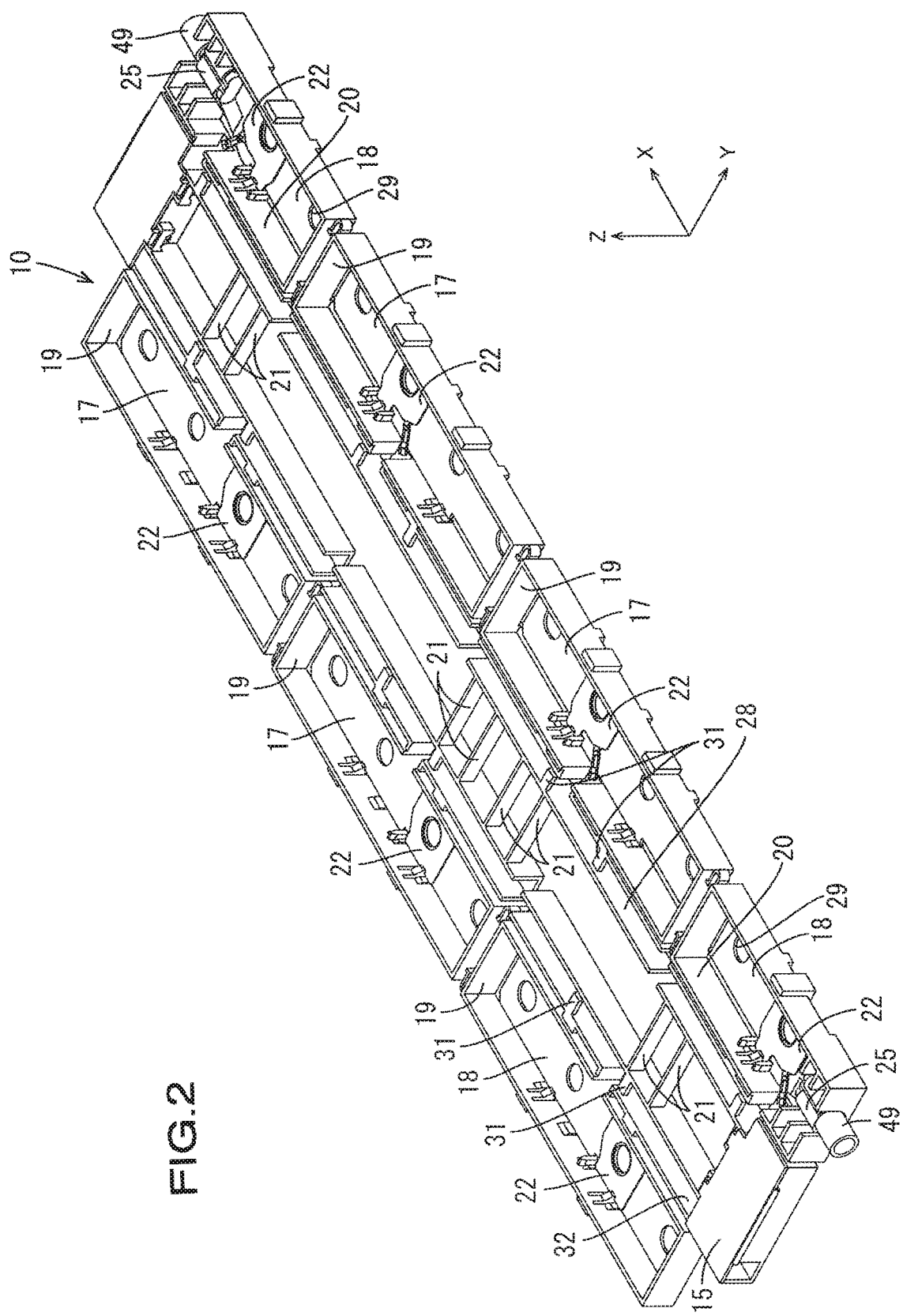
FIG. 2 is a perspective view showing a wiring module.

As shown in FIG. 2, the wiring module 10 includes an insulating protector 15 and a plurality of connection bus bars 17 (examples of a bus bar) arranged in the insulating protector 15.

Insulating Protector 15

The insulating protector 15 is made of a synthetic resin with insulating properties. The insulating protector 15 is configured to house the connection bus bars 17 that electrically connect adjacent sets 50 of power storage devices 11, and output bus bars 18 that are arranged on the left and right end portions of the power storage device group 12 and electrically connect the power storage device group 12 and an external circuit to each other.

At positions near the rear end portion of the insulating protector 15, a plurality (three in the present embodiment) of connection bus bar housing portions 19 are provided, into which a plurality (three in the present embodiment) of connection bus bars 17 are respectively housed. The connection bus bar housing portions 19 have a substantially rectangular shape elongated in the left-right direction when seen from above, and are formed to be slightly larger than the connection bus bars 17. The connection bus bar housing portions 19 have a box shape and are open upward.

At positions near the front end portion of the insulating protector 15, a plurality (two in the present embodiment) of connection bus bar housing portions 19 are provided into which a plurality (two in the present embodiment) of connection bus bars 17 are respectively housed. At positions that are near the front end portion and are on the left and right end portions of the insulating protector 15, output bus bar housing portions 20 that house the output bus bars 18 are provided, respectively. The output bus bar housing portions 20 have a substantially rectangular shape elongated in the left-right direction when seen from above, and are formed to be slightly larger than the output bus bars 18. The output bus bar housing portions 20 have a box shape and are open upward.

Linking portions 21 that have a plate shape extending in the front-rear direction link the plurality of connection bus bar housing portions 19 provided at positions near the rear end portion of the insulating protector 15 to the plurality of connection bus bar housing portions 19 and the plurality of output bus bar housing portions 20 provided at positions near the front end portion of the insulating protector 15.

Figure 3:
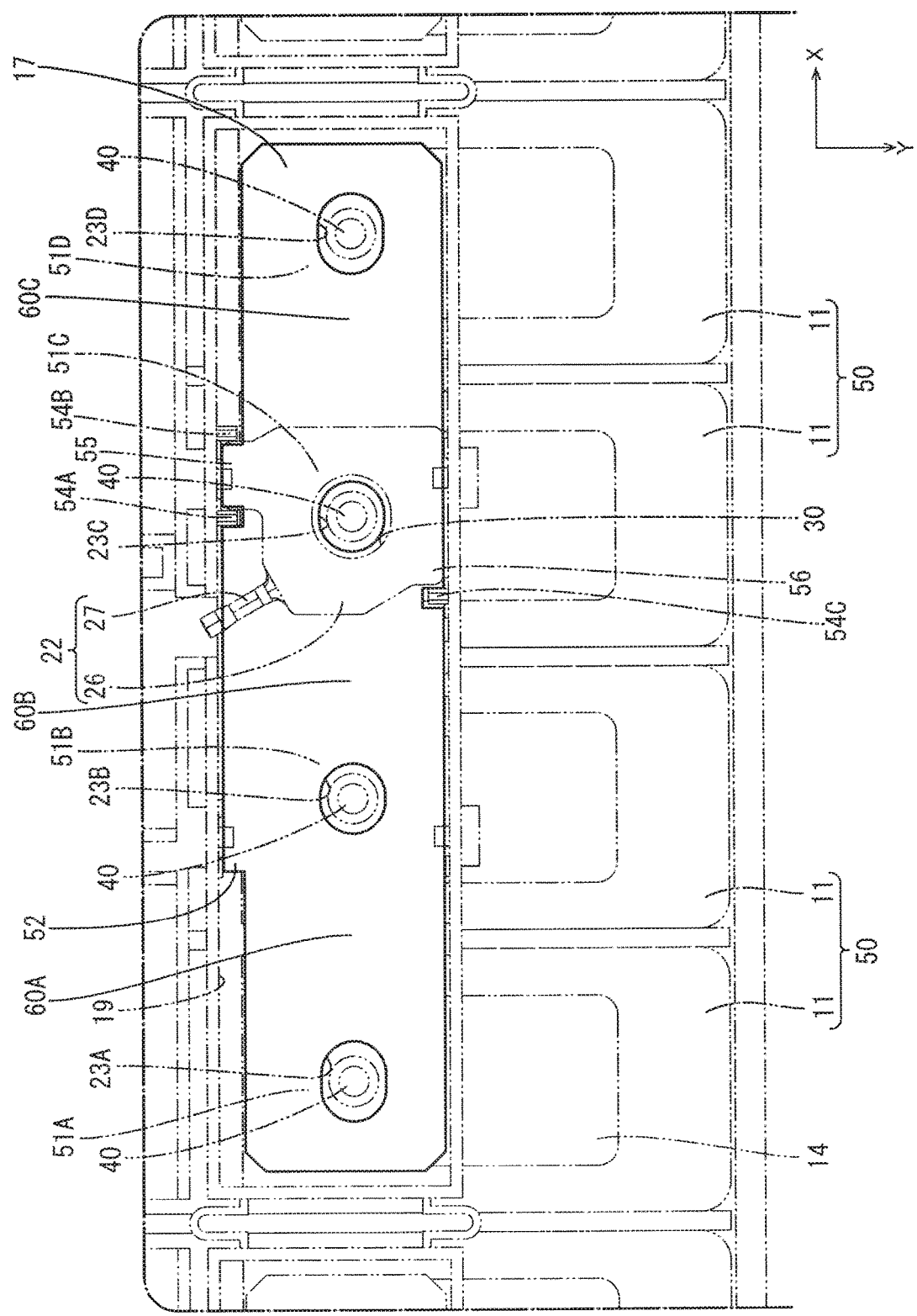
FIG. 3 is a partially enlarged plan view showing a connection bus bar and a voltage detection terminal that are housed in an insulating protector.

As shown in FIG. 3, in each connection bus bar housing portion 19, a connection bus bar 17 is housed in a state overlapped by a voltage detection terminal 22. Also, in each output bus bar housing portion 20, an output bus bar 18 is housed in a state overlapped by a voltage detection terminal 22.

Connection Bus Bar 17

Figure 4:
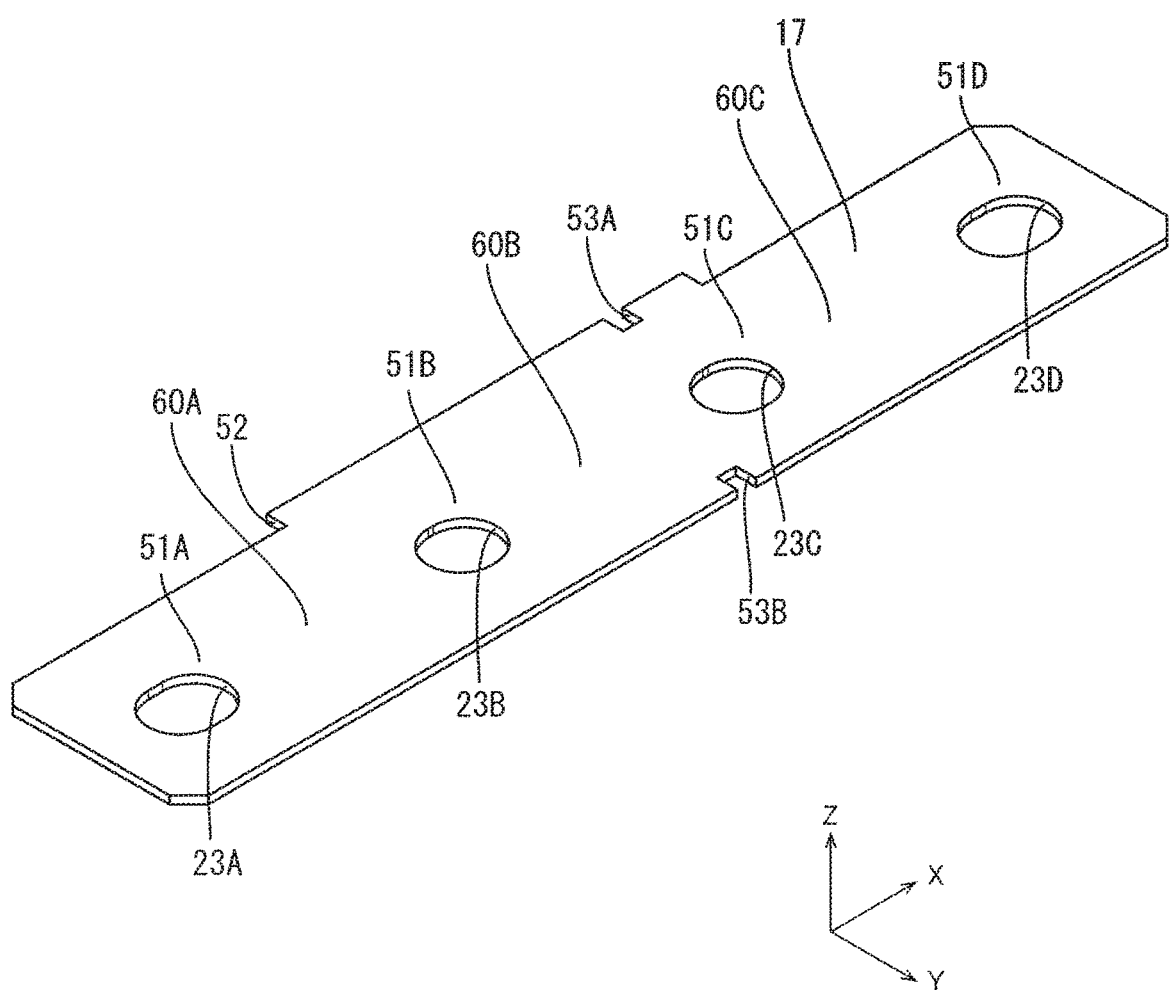
FIG. 4 is a perspective view showing the connection bus bar.
Figure 5:
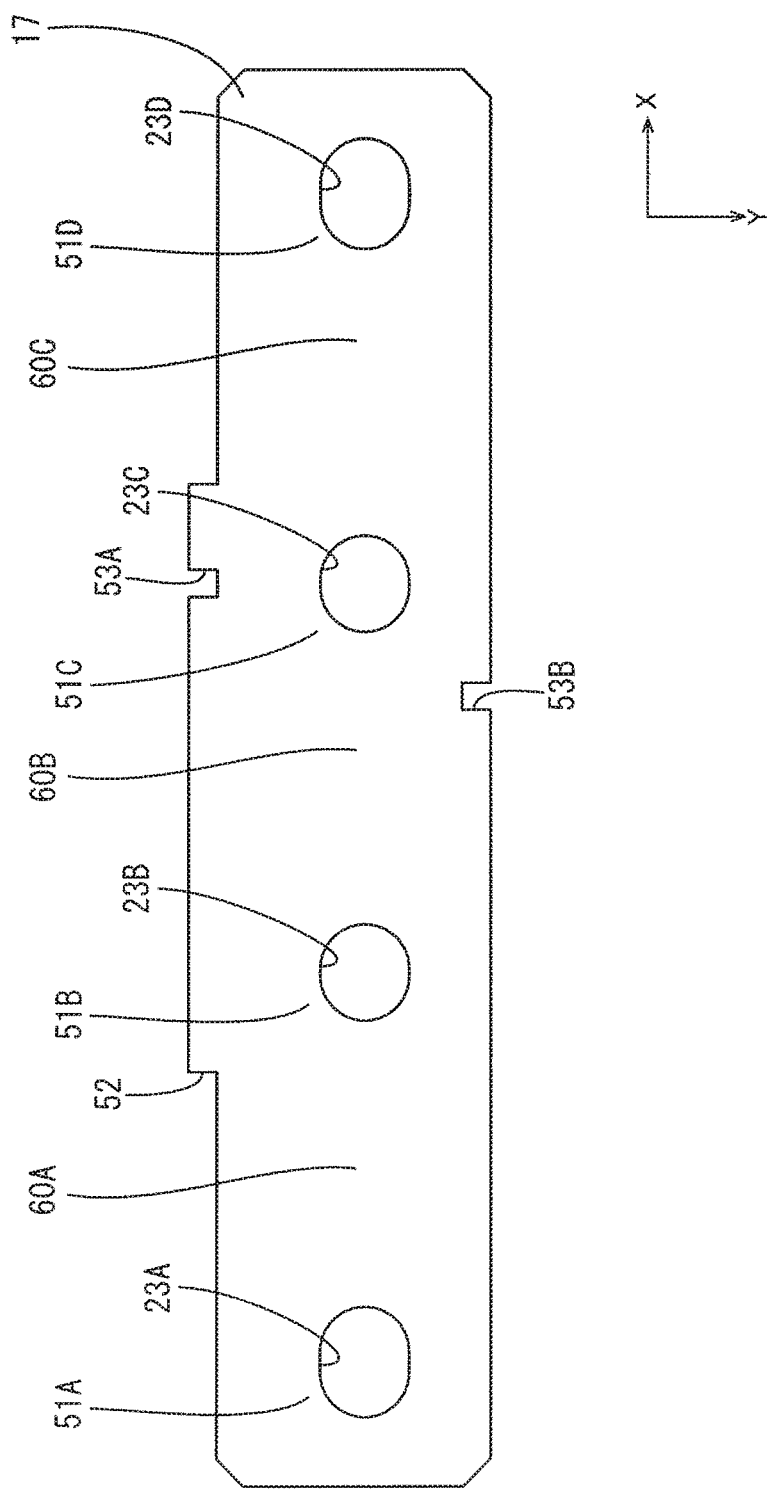
FIG. 5 is a plan view showing the connection bus bar.

As shown in FIGS. 4 and 5, the connection bus bars 17 are formed by pressing a metal plate into a predetermined shape. As the material of the metal plate, copper, a copper alloy, iron, an iron alloy, aluminum, an aluminum alloy, or the like can be appropriately selected as needed. The connection bus bars 17 have an elongated shape in the left-right direction when seen from above.

As shown in FIG. 3, in each connection bus bar 17, a plurality of through-holes (four in the present embodiment) 23A, 23B, 23C, and 23D through which stud bolts 40 each having a screw thread thereon are passed are formed penetrating the connection bus bar 17. The through-holes 23A to 23D are formed in a row in the left-right direction. Nuts (not shown) are screwed onto the stud bolts 40 in a state where the stud bolts 40 are respectively passed through the through-holes 23A to 23D, and the connection bus bars 17 are sandwiched between the nuts and the electrode terminals 14, and thus the electrode terminals 14 and the connection bus bars 17 are electrically connected.

In each connection bus bar 17, the vicinities of the regions in which the through-holes 23A to 23D are provided are respectively electrode connection portions 51A, 51B, 51C and 51D that are to be electrically connected to the electrode terminals 14. In a state where the wiring module 10 is attached to the power storage device group 12, the electrode terminals 14 are electrically connected to the electrode connection portions 51A, 51B, 51C, and 51D.

The electrode connection portions 51A to 51D are formed in a row in the left-right direction. Each connection bus bar 17 is provided with an even number of electrode connection portions 51A to 51D. The number of electrode connection portions 51A to 51D and through-holes 23A to 23D provided in one connection bus bar 17 is 2n (n is a natural number greater than or equal to 2, n=2 in this embodiment). That is, the number of electrode connection portions 51A to 51D and through-holes 23A to 23D provided in one connection bus bar 17 is four, six, eight, . . . , 2n.

The through-holes 23B and 23C each have an elliptical shape extending slightly in the left-right direction from a perfect circular shape. On the other hand, the through-holes 23A and 23D each have an oval shape that is more elongated in the left-right direction than the through-holes 23B and 23C. In other words, the opening areas of the through-holes 23B and 23C are set to be smaller than those of the through-holes 23A and 23D.

Also, the adjacent electrode connection portions 51A and 51B are linked by a linking portion 60A. In the same manner, the adjacent electrode connection portions 51B and 51C are linked by a linking portion 60B, and the adjacent electrode connection portions 51C and 51D are linked by a linking portion 60C.

With the above-described configuration, a set 50 of power storage devices 11 formed by two power storage devices 11 connected in parallel by the adjacent electrode connection portions 51A and 51B and a set 50 of power storage devices 11 formed by two power storage devices 11 connected in parallel by the adjacent electrode connection portions 51C and 51D are connected in series by the connection bus bar 17.

The second linking portion 60B counted from the right end portion of the bus bar 17 is formed to be wider in the front-rear direction than the linking portion 60A close to the right end portion of the connection bus bar 17 and the linking portion 60C close to the left end portion of the connection bus bar 17. Accordingly, the cross-sectional area of the linking portion 60B is set larger than those of the linking portions 60A and 60C. In other words, the cross-sectional area of the linking portion 60B is set to be the largest of all of the linking portions 60A, 60B, and 60C.

The width dimensions in the front-rear direction of the linking portions 60A and 60C are set to be equal to each other. Accordingly, the cross-sectional areas of the linking portions 60A and 60C are equal to each other. In other words, the cross-sectional areas of the linking portions 60A and 60C located symmetrically in the left-right direction with respect to the linking portion 60B are set to be equal to each other.

Output Bus Bar 18

As shown in FIG. 2, in each of the output bus bars 18, a plurality (two in the present embodiment) of through-holes 29, through which bolts (not shown) are to be passed, are formed extending through the output bus bar 18. At one end portion of each output bus bar 18, a barrel portion 25 is provided to which a wire 24, which is for electrically connecting an external circuit and the power storage device group 12 to each other, is connected. The wire 24 and the output bus bar 18 are electrically connected to each other by crimping the barrel portion 25 to the outer circumferential surface of the wire 24. The wire 24 connected to the output bus bar 18 disposed at the left end portion of the insulating protector 15 is drawn out to the left from the insulating protector 15. Also, the wire 24 connected to the output bus bar 18 disposed at the right end portion of the insulating protector 15 is drawn out to the right from the insulating protector 15. The configuration of the output bus bars 18 is otherwise the same as that of the above-described connection bus bars 17, and thus a redundant description is omitted.

Voltage Detection Terminal 22

As shown in FIG. 3, the voltage detection terminal 22 is formed by pressing a metal plate into a predetermined shape. As the material of the metal plate, copper, a copper alloy, iron, an iron alloy, aluminum, an aluminum alloy, or the like can be appropriately selected as needed. The voltage detection terminal 22 includes an electrode connection portion 26 that has a plate shape, and a barrel portion 27 extending from the electrode connection portion 26.

The electrode connection portion 26 is provided with a through-hole 30 through which a stud bolt 40 is to be passed. The inner shape of the through-hole 30 is formed somewhat larger than those of the through-holes 23B and 23C, and is formed smaller than those of the through-holes 23A and 23D. The electrode connection portion 26 is sandwiched between a nut and the connection bus bar 17 or the output bus bar 18, and as a result, the voltage detection terminal 22 and a corresponding electrode terminal 14 are electrically connected to each other.

The barrel portion 27 is crimped to one end portion of the voltage detection wire 16 (an example of a wire). The other end portion of the voltage detection wire 16 is connected to an external connection device (not shown) such as an ECU (Electronic Control Unit).

Note that the ECU is equipped with a micro computer, elements, and the like, and employs a known configuration equipped with the functions of detecting the voltage, current, temperature, and the like of the power storage devices 11, and controlling charging, discharging, and the like of each of the power storage devices 11.

Front Side Routing Portion 28

As shown in FIG. 2, a front side routing portion 28 elongated in the left-right direction is provided rearward of the connection bus bar housing portions 19 and the output bus bar housing portions 20 that are provided at positions close to the front end portion of the insulating protector 15.

One of the groove walls that constitute the front side routing portion 28 is provided with restriction pieces 31 that protrude toward the other groove wall. A gap large enough for the voltage detection wire 16 to be passed through is provided between the leading end portions of the restriction pieces 31 and the other groove wall. The voltage detection wires 16 are arranged in the front side routing portion 28 through this gap, and the voltage detection wires 16 are restricted from coming out of the front side routing portion 28 through this gap.

Rear Side Routing Portion 32

A rear side routing portion 32 extending in the left-right direction is provided forward of the plurality of connection bus bar housing portions 19 that are provided at positions near the rear end portion of the insulating protector 15. Restriction pieces 31 are formed on one of the groove walls that constitute the rear side routing portion 32. The configuration of the rear side routing portion 32 is otherwise the same as that of the above-described front side routing portion 28, and thus a redundant description is omitted.

Positioning Structure

As shown in FIG. 5, each connection bus bar 17 has a protruding portion 52 that protrudes rearward from the rear end edges of the second (n-th) electrode connection portion 51B from the right and the third ((n+1)-th) electrode connection portion 51C from the right. Due to this protruding portion 52, the width dimensions in the front-rear direction of the electrode connection portions 51B and 51C are set larger than those of the electrode connection portions 51A and 51D. As a result, the cross-sectional areas of the electrode connection portions 51B and 51C are larger than those of the electrode connection portions 51A and 51D. Note that the order of the electrode connection portions 51A to 51D may be counted from the left end portion of the connection bus bar 17 or may be counted from the right end portion thereof.

As shown in FIG. 5, in the protruding portion 52, the portion corresponding to the third electrode connection portion 51C from the right is provided with a positioning receiving portion 53A that is depressed forward. Also, a positioning receiving portion 53B that is depressed rearward is provided in the front end edge of the electrode connection portion 51C.

Figure 6:
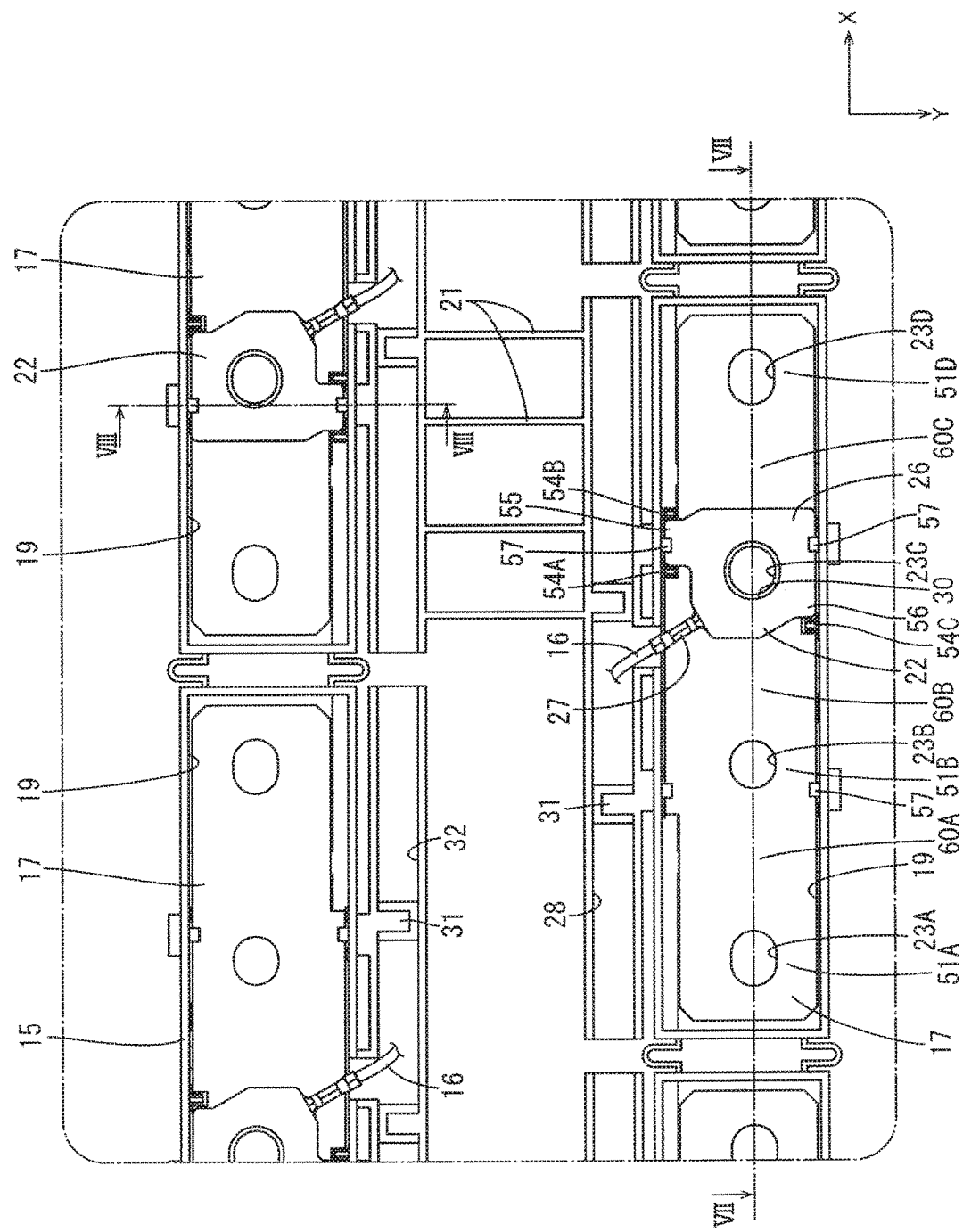
FIG. 6 is a partially enlarged plan view showing the connection bus bar and the voltage detection terminal that are housed in the insulating protector.

As shown in FIGS. 3 and 6, each connection bus bar housing portion 19 is provided with positioning portions 54A, 54B, and 54C that protrude to the inner side of the connection bus bar housing portion 19 in the state where the connection bus bar 17 is housed inside the connection bus bar housing portion 19. The positioning portion 54A is provided at a position corresponding to the positioning receiving portion 53A and is fitted to the positioning receiving portion 53A. The positioning portion 54B is in contact with the left end portion of the protruding portion 52 from the left. The positioning portion 54C is fitted to the positioning receiving portion 53B.

As a result of the positioning portion 54A being fitted to the positioning receiving portion 53A, the positioning portion 54B being in contact with the protruding portion 52, and the positioning portion 54C being fitted to the positioning receiving portion 53B, the connection bus bar 17 is positioned in the connection bus bar housing portion 19.

As shown in FIGS. 3 and 6, a rotation preventing portion 55 that is inserted between the positioning portions 54A and 54B is formed so as to protrude from the electrode connection portion 26 of the voltage detection terminal 22. Also, the electrode connection portion 26 is provided with a rotation preventing engaging portion 56 that comes in contact with the positioning portion 54C from a lateral side. In this manner, as a result of the rotation preventing portion 55 being inserted between the positioning portions 54A and 54B and the rotation preventing engaging portion 56 being in contact with the positioning portion 54C from a lateral side, the voltage detection terminal 22 is prevented from rotating.

As shown in FIGS. 7 and 8, the connection bus bar 17, the output bus bar 18, and the voltage detection terminal 22 are to be housed in the connection bus bar housing portion 19 and the output bus bar housing portion 20 in a corresponding manner in a state where they are prevented from coming out upward by being elastically locked from above using locking claws 57 provided in the connection bus bar housing portion 19 and the output bus bar housing portion 20.

Actions and Effects of this Embodiment

Next, the actions and effects of this embodiment will be described. This embodiment is the wiring module 10 that to be arranged on in the plurality of power storage devices 11 each having the electrode terminals 14, the wiring module 10 including: the plurality of connection bus bars 17 each connected to a corresponding electrode terminal 14, and each having the 2n (n is a natural number greater than or equal to 2) electrode connection portions 51A to 51D and the 2n−1 linking portions 60A, 60B, and 60C linking adjacent electrode connection portions 51A to 51D among the 2n electrode connection portions 51A to 51D; and the insulating protector 15 that houses the plurality of connection bus bars 17. In each of the plurality of connection bus bars 17, the cross-sectional area of the n-th linking portion 60B from one end of the connection bus bar 17 is set to be the largest among the cross-sectional areas of all of the 2n−1 linking portions 60A, 60B, and 60C.

With the above-described configuration, because the connection bus bar 17 has 2n (n is a natural number greater than or equal to 2, n=2 in this embodiment) electrode connection portions 51A to 51D, the sets 50 of the power storage devices 11 each formed by connecting two power storage devices 11 in parallel can be connected in series using one connection bus bar 17. At this time, the current density of the second linking portion 60B that links the second electrode connection portion 51B and the third electrode connection portion 51C from the right end portion of the connection bus bar 17 is larger than those of the other linking portions. For this reason, there is a concern that the amount of heat generated may increase during energization. According to this embodiment, the cross-sectional area of the second linking portion 60B is set larger than the cross-sectional areas of the other linking portions 60A and 60C. Accordingly, the electrical resistance of the second linking portion 60B can be made smaller than that of the other linking portions 60A and 60C. In this manner, the amount of heat generated in the second linking portion 60B can be reduced during energization.

Also, according to this embodiment, the cross-sectional area of the first linking portion 60A from the right end portion of the connection bus bar 17 is the smallest between the cross-sectional areas of the first and the second linking portions 60A and 60B, and the cross-sectional area of the third linking portion 60C from the right end portion of the connection bus bar 17 is the smallest between the cross-sectional areas of the second and the third linking portions 60B and 60C.

In the connection bus bar 17, the current density of the first linking portion 60A from the right end portion is smaller than that of the second linking portion 60B, and thus the amount of heat generated in the first linking portion 60A during energization is smaller than that of the second linking portion 60B. Similarly, the amount of heat generated in the third linking portion 60C during energization is smaller than that of the second linking portion 60B. With the above-described configuration, the cross-sectional areas of the first and the third linking portions 60A and 60C can be made small, and thus the weight of the connection bus bar 17 can be reduced.

Also, according to this embodiment, in each of the plurality of connection bus bars 17, the cross-sectional area sequentially increases from the first linking portion 60A to the second linking portion 60B from the right end portion of the bus bar 17, and the cross-sectional area sequentially decreases from the second linking portion to the third linking portion.

With the above-described configuration, the cross-sectional areas of the linking portions 60A, 60B, and 60C can be set according to the magnitude of the current density, and thus the amount of heat generated during energization can be reliably reduced.

Also, according to this embodiment, in each of the plurality of connection bus bars 17, the cross-sectional areas of the two linking portions 60A and 60C located symmetrically with respect to the second linking portion 60B from the right end portion are set to be equal to each other.

With the above-described configuration, because the cross-sectional areas of the linking portions 60A and 60C that have the same level of current density can be set equal to each other, and thus the cross-sectional areas of the linking portions 60A and 60C are kept from becoming larger than necessary. As a result, the weight of the connection bus bars 17 can be reduced.

Also, according to this embodiment, in each of the plurality of connection bus bars 17, the cross-sectional area of the second electrode connection portion 51B from the right and the cross-sectional area of the third electrode connection portion 51C from the right are set to be larger than the cross-sectional areas of the other electrode connection portions 51A and 51D.

With the above-described configuration, because each connection bus bar 17 has four electrode connection portions 51A to 51D, the sets 50 of the power storage devices 11 each formed by connecting two power storage devices 11 in parallel can be connected in series using one connection bus bar 17. At this time, the current density of the second electrode connection portion 51B from the right and the third electrode connection portion 51C from the right is larger than that of the other electrode connection portions. For this reason, there is concern that the amount of heat generated may increase during energization. With the technology disclosed in the present specification, the cross-sectional areas of the second and the third electrode connection portions 51B and 51C from the right are set to be larger than those of the other electrode connection portions 51A and 51D. Accordingly, the amount of heat generated in the second and the third electrode connection portions 51B and 51C from the right can be reduced during energization.

Also, according to this embodiment, the second electrode connection portion 51B and the third electrode connection portion 51C from the right of the connection bus bar 17 are formed to be wider than the other electrode connection portions.

With the above-described technology, the cross-sectional areas of the second electrode connection portion 51B and the third electrode connection portion 51C from the right of the connection bus bar 17 can be made larger than those of the other electrode connection portions using a simple method of making the width dimensions of the second electrode connection portion 51B and the third electrode connection portion 51C from the right of the connection bus bar 17 wider than those of the other electrode connection portions. Accordingly, the manufacturing cost of the wiring module 10 can be kept from increasing.

Also, according to this embodiment, on one or both of the second electrode connection portion 51B from the right and the third electrode connection portion 51C from the right, the positioning receiving portions 53A and 53B for positioning relative to the insulating protector 15 by engaging with the positioning portions 54A, 54B, and 54C provided on the insulating protector 15 are provided.

With the above-described configuration, because the positioning receiving portions 53A and 53B are provided on one or both of the electrode connection portions 51B and 51C that are formed to be wider than the other electrode connection portions of the connection bus bar 17, a reduction in the cross-sectional area of the connection bus bar 17 by providing the positioning receiving portions 53A and 53B can be suppressed.

Also, according to this embodiment, at least one through-hole 23A to 23D is formed in each of the plurality of electrode connection portions 51A to 51D, and the opening areas of the through-hole 23B of the second electrode connection portion 51B from the right of the connection bus bar 17 and the through-hole 23C of the third electrode connection portion 51C from the right of the connection bus bar 17 are set to be smaller than the opening areas of the through-holes 23A and 23D of the other electrode connection portions 51A and 51D.

With the above configuration, a reduction in the cross-sectional areas of the electrode connection portions 51B and 51C with the highest current density can be suppressed.

Also, according to this embodiment, the voltage detection terminal 22 that is electrically connected to a corresponding electrode terminal 14 is connected to the third electrode connection portion 51C from the right of the connection bus bar 17.

With the above-described configuration, the contact area between the voltage detection terminal 22 and the third electrode connection portion 51C from the right of the connection bus bar 17 can be made larger than that in the case in which the voltage detection terminal 22 is connected to the electrode connection portion 51A or 51D. As a result, the accuracy in detecting the voltage of the power storage device 11 can be improved.

The power storage module 13 according to this embodiment includes the plurality of power storage devices 11 each having the electrode terminals 14, and the wiring module 10.

With the above-described configuration, the sets 50 of the power storage devices 11 each formed by connecting n power storage devices 11 in parallel can be connected in series. In this manner, the entire capacity of the power storage module 13 can be improved.

Other Embodiments

The technology disclosed in the present specification is not limited to the embodiment described in the above description with reference to the drawings, and embodiments such as the following also fall within the technical scope of the technology disclosed in the present specification, for example.

(1) In this embodiment, a configuration was employed in which the connection bus bar 17 has the four through-holes 23A to 23D, but there is no limitation to this, and a configuration may be employed in which the connection bus bar 17 has an even number of six or more through-holes.

(2) In this embodiment, a configuration was employed in which the connection bus bar 17 has the through-holes 23A to 23D, but there is no limitation to this, and a configuration may be employed in which the connection bus bar 17 has no through-holes. In this case, the connection bus bar 17 and the electrode terminal 14 can be connected through welding, soldering, or the like.

(3) In this embodiment, a configuration was employed in which the n-th and the (n+1)-th electrode connection portions of the connection bus bar 17 are made to be wider than the other electrode connection portions, but there is no limitation to this, and a configuration may be employed in which the n-th and the (n+1)-th electrode connection portions are made to be thicker than the other electrode connection portions.

(4) In this embodiment, a configuration was employed in which the positioning receiving portions that engage with the positioning portions of the insulating protector 15 are provided on the n-th and the (n+1)-th electrode connection portions of the connection bus bar 17, but there is no limitation to this, and a configuration may be employed in which the positioning receiving portions are provided at any positions of the connection bus bar 17.

(5) The power storage device 11 may be a capacitor.

(6) A configuration may be employed in which the voltage detection terminal 22 is arranged to overlap the electrode connection portion 51B from above.

(7) In this embodiment, a configuration was employed in which the width dimension in the front-rear direction of the cross-sectional area of the linking portion 60B is set to be larger than that of the other linking portions 60A and 60C, but there is no limitation to this, and a configuration may be employed in which the thickness dimension of the linking portion 60B is set to be larger than that of the other linking portions 60A and 60C.

LIST OF REFERENCE NUMERALS

10: Wiring module
11: Power storage device
13: Power storage module
14: Electrode terminal
15: Insulating protector
17: Connection bus bar
22: Voltage detection terminal
23A,23B,23C,23D: Through-hole
51A,51B,51C,51D: Electrode connection portion
53A, 53B: Positioning receiving portion
54A,54B,54C: Positioning portion
60A,60B,60C: Linking portion

What is claimed is:

1. A wiring module configured to be arranged on a plurality of power storage devices each having electrode terminals, the wiring module comprising:
   a plurality of bus bars each connected to a corresponding electrode terminal, and each having 2n electrode connection portions and 2n−1 linking portions each linking adjacent electrode connection portions among the 2n electrode connection portions, where n is a natural number greater than or equal to 2; and an insulating protector that houses the plurality of bus bars, wherein, in each of the plurality of bus bars, a cross-sectional area of an n-th linking portion from one end portion of the bus bar is the largest of the cross-sectional areas of all of the 2n−1 linking portions, and the n-th linking portion includes a protrusion that protrudes from an edge of the bus bar in a direction that is perpendicular to a thickness direction of the bus bar and to a longitudinal direction of the bus bar.

2. The wiring module according to claim 1, wherein in each of the bus bars, the cross-sectional area of the first linking portion from the one end portion of the bus bar is the smallest of the cross-sectional areas of the first to the n-th linking portions, and the cross-sectional area of the (2n−1)-th linking portion from the one end portion of the bus bar is the smallest of the cross-sectional areas of the n-th to the (2n−1)-th linking portions.

3. The wiring module according to claim 1, wherein in each of the bus bars, the cross-sectional area sequentially increases from the first linking portion to the n-th linking portion from the one end portion of the bus bar, and the cross-sectional area sequentially decreases from the n-th linking portion to the (2n−1)-th linking portion from the one end portion of the bus bar.

4. The wiring module according to claim 1, wherein in each of the bus bars, the cross-sectional areas of the two linking portions located symmetrically with respect to the n-th linking portion are equal to each other.

5. The wiring module according to claim 1, wherein in each of the bus bars, the cross-sectional areas of the n-th electrode connection portion and the (n+1)-th electrode connection portion from the one end portion of the bus bar are larger than the cross-sectional areas of the other electrode connection portions.

6. The wiring module according to claim 1, wherein in each of the bus bars, the n-th electrode connection portion and the (n+1)-th electrode connection portion from the one end portion of the bus bar are wider than the other electrode connection portions.

7. The wiring module according to claim 1, wherein in each of the bus bars, one or both of the n-th electrode connection portion and the (n+1)-th electrode connection portion from the one end portion of the bus bar includes a positioning receiving portion for positioning relative to the insulating protector by engaging with a positioning portion provided on the insulating protector.

8. The wiring module according to claim 1, wherein at least one through-hole is formed in each of the plurality of electrode connection portions, and in each of the bus bars, the opening areas of the through-hole of the n-th electrode connection portion from the one end portion of the bus bar and the through-hole of the (n+1)-th electrode connection portion from the one end portion of the bus bar are smaller than the opening areas of the through-holes of the other electrode connection portions.

9. The wiring module according to claim 1, wherein in each of the bus bars, a voltage detection terminal that is electrically connected to a corresponding electrode terminal is connected to at least one of the n-th electrode connection portion and the (n+1)-th electrode connection portion from the one end portion of the bus bar.

10. A power storage module, comprising:

a plurality of power storage devices each having electrode terminals; and the wiring module according to claim 1.

* * * * *